Jan. 9, 1968     R. ALAJOUANINE     3,362,486

IMPACT WRENCHES

Filed June 15, 1965     9 Sheets-Sheet 1

INVENTOR

RÉMI ALAJOUANINE

BY: Ameta & Rothstein

ATTORNEYS

Jan. 9, 1968  R. ALAJOUANINE  3,362,486
IMPACT WRENCHES

Filed June 15, 1965  9 Sheets-Sheet 2

INVENTOR
RÉMI ALAJOUANINE
BY: Amster & Rothstein
ATTORNEYS Jan. 9, 1968   R. ALAJOUANINE   3,362,486
IMPACT WRENCHES Filed June 15, 1965   9 Sheets-Sheet 8

INVENTOR

RÉMI ALAJOUANINE
BY: Amster & Rothstein
ATTORNEYS

Jan. 9, 1968

R. ALAJOUANINE 3,362,486

IMPACT WRENCHES

Filed June 15, 1965

INVENTOR

RÉMI ALAJOUANINE
BY: Amster & Rothstein
ATTORNEYS

United States Patent Office 3,362,486
Patented Jan. 9, 1968

3,362,486
IMPACT WRENCHES
Rémi Alajouanine, Clamart, France, assignor to Forges et Ateliers de Meudon, Meudon, France
Filed June 15, 1965, Ser. No. 464,155
Claims priority, application France, June 16, 1964, 978,433, Patent 1,407,701; Apr. 12, 1965, 12,845, Patent 1,456,481
7 Claims. (Cl. 173—93.5)

ABSTRACT OF THE DISCLOSURE

A portable power tool or impact wrench for tightening or loosening screws or nuts by rotation having two hammers fulcrumed on a pivot and pivotally movable through an impact stroke, characterized by a positive locking device which, operating under spring bias, is effective to lock both hammers in an inoperative position during each half-revoluton of operation of the tool and, in this manner, limit the hammers to one impact stroke per each revolution of operation of the tool.

This invention relates essentially to portable power tools deisgned to tightening or loosening nuts, screws, bolts, studs, etc., by means of repeated rotary impulses, these tools being commonly referred to as "impact wrenches" or "percussion wrenches."

The operation of these tools is based on the principle of the transformation of a driving power supplied by a rotary pneumatic motor of which the revolving member, such as a rotor, gear or crankshaft, coupled directly to the impact mechanism, is suddenly stopped at each revolution exactly at the impact time. This series of discontinuous rotary impacts produces successive and repeated torques considerably higher than the torque of the motor driving the mechanism.

It is an essential object of this invention to provide a very compact impact mechanism in a tool of this character in order to obtain the maximum ratio of tool power to tool mass or weight.

This impact wrench of the general type disclosed in the U.S. Patent No. 3,144,109 is characterized in that it comprises a cylindrical hammer carrier in which two diametrally opposite longitudinal grooves are formed, each groove being adapted to receive a hammer fulcrumed on a pivot pin. A positive locking device rotatably fast with the tool carrier is radially urged by a spring responsive to the hammer-carrier rotation so as to lock both hammers in their inoperative position after each shock applied by these hammers to the corresponding anvils of the tool carrier, during a half-revolution of the hammer carrier, thus limiting the simultaneous action of the two hammers on these anvils to a single impact per revolution of the hammer carrier.

The impact wrench according to this invention is of the type wherein a cylindrical hammer carrier has two diametrally opposite longitudinal grooves formed therein, these grooves being each adapted to receive a hammer fulcrumed on a separate pin. A positive locking device rotatably rigid with the tool carrier and urged in the radial direction by a spring responsive to the rotation of the hammer carrier is adapted to lock the two hammers in their release position after each shock applied by these hammers to the tool-carrier anvils during a half-revolution of the hammer carrier, thus limiting the simultaneous action of the pair of hammers on the relevant anvils to a single impact per revolution of the hammer carrier.

Furthermore, according to a modified form of embodiment of this wrench the power-to-mass ratio of the impact mechanism may be increased by providing a complementary mechanism housed in the hammer carrier and adapted to limit the simultaneous action of the two hammers on the corresponding anvils of the tool carrier to only one impact every other revolution of the hammer carrier.

The features and advantages of this invention will appear more clearly as the following description proceeds with reference to the attached drawings illustrating diagrammatically by way of example a typical form of embodiment of this invention.

In the drawings:

FIGURES 27 to 35 inclusive show the details of the essential component elements, in this alternate form of embodiment, of the complementary mechanism to be housed in the hammer carrier as a substitute for the push member of FIGURES 24, 25 and 26 for producing one impact every other revolution of the hammer carrier; thus, more particularly:

Figure 1:
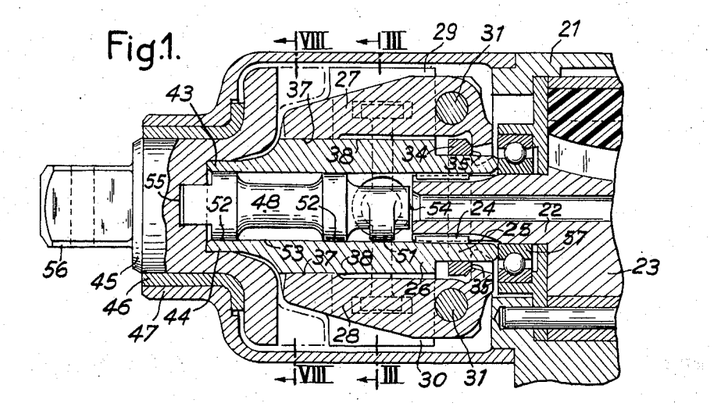
FIGURE 1 is an axial section showing one portion of the impact wrench incorporating a blade-type pneumatic motor, the impact mechanism being shown with the hammers completely retracted and locked.
Figure 19:
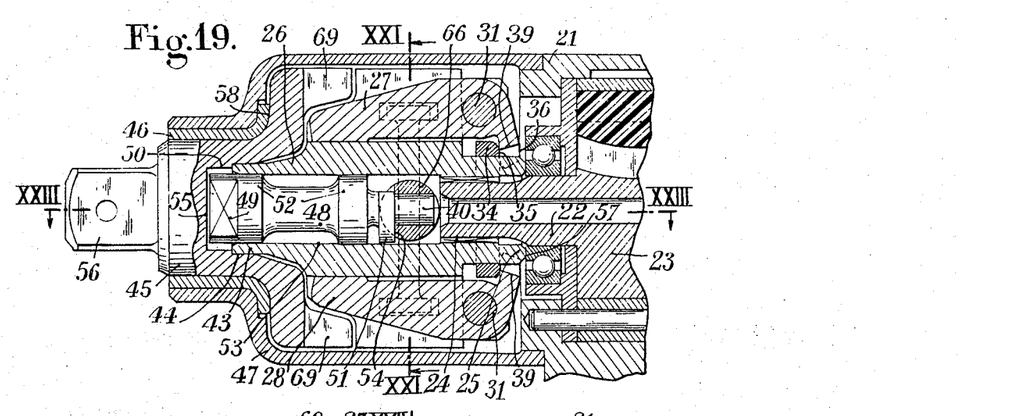
FIGURES 19 to 23 inclusive, respectively similar to FIGURES 1 to 5, illustrate a modified form of embodiment of the mechanism of this invention.

As shown in FIGURE 1 or 19, a casing 21 encloses a reversible pnuematic motor of which the shaft 22 of rotor 23 has a splined end portion 24 engaged in the female longitudinal splines or grooves formed in the cylindrical rear portion 25 of a hammer carrier member 26. This hammer carrier 26 is thus rotatably coupled with the rotor 23 of the pneumatic motor.

Figure 2:
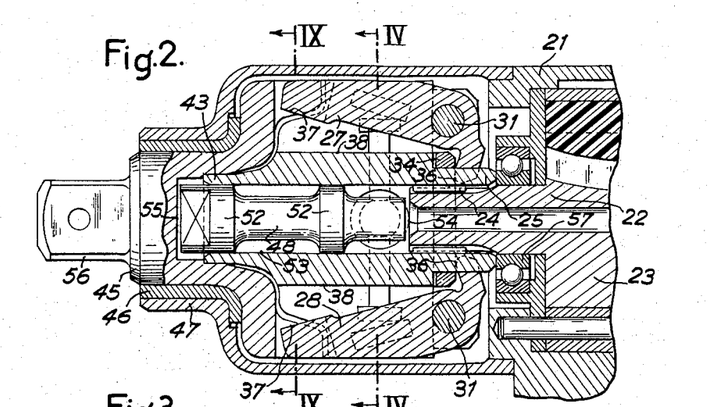
FIGURE 2 is a view similar to FIGURE 1 showing the impact mechanism with the hammers in their outermost released position.
Figure 5:
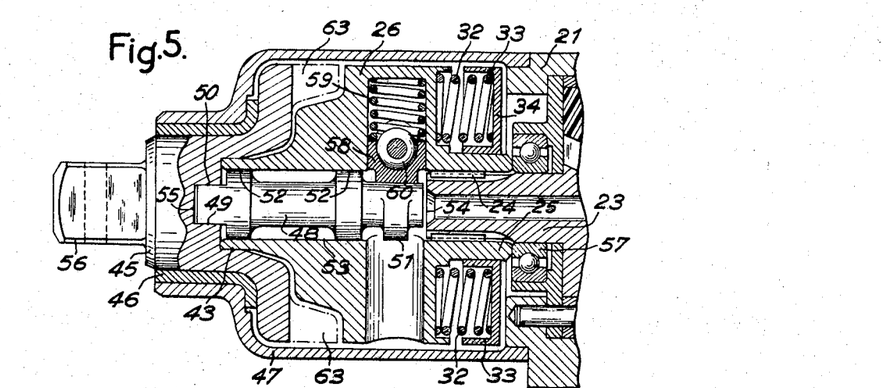
FIGURE 5 is a section taken upon a plane perpendicular to the plane of the section of FIGURE 1, showing the impact mechanism with the two springs urging the hammers towards the center and the third spring urging the lock member into the hammer notches.
Figure 6:
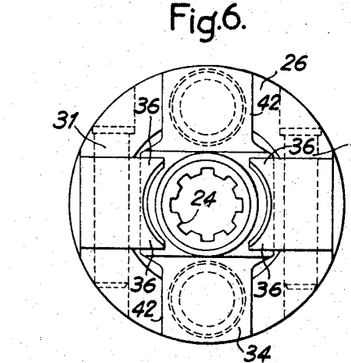
FIGURE 6 shows an end view from the rear of the rotary assembly of the impact mechanism illustrated in side view in FIGURE 7.
Figures 10, 11, 12, 13, 14, 15:
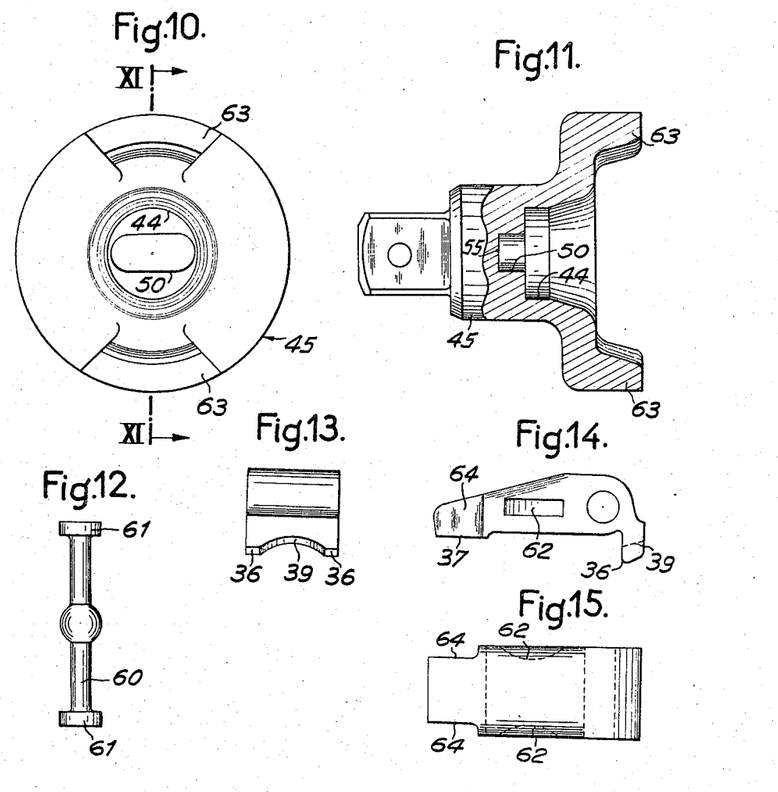
FIGURE 10 is an end view from the rear of the tool holder.
FIGURE 11 is a section taken upon the line XI—XI of FIGURE 10, showing the tool holder.
FIGURE 12 shows separately the lock member of which the enlarged or shouldered ends are adapted to engage with the proper timing one of the two notches of each hammer shown respectively in side elevational view and in plan view in FIGURES 13, 14, 15, in order to lock them in their fully retracted position.
Figure 16:
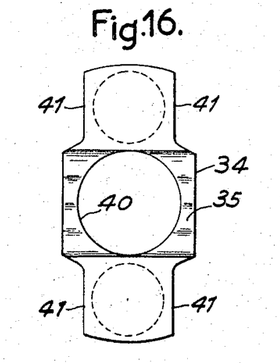
FIGURES 16, 17 and 18 are respectively a plan view from above, a section taken upon the line XVII—XVII and a plan view from beneath, showing the yoke formed with two diametrally opposite recesses receiving the pair of return springs urging the hammers to their released position.
Figure 17:
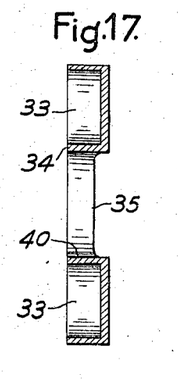
Figure 23:
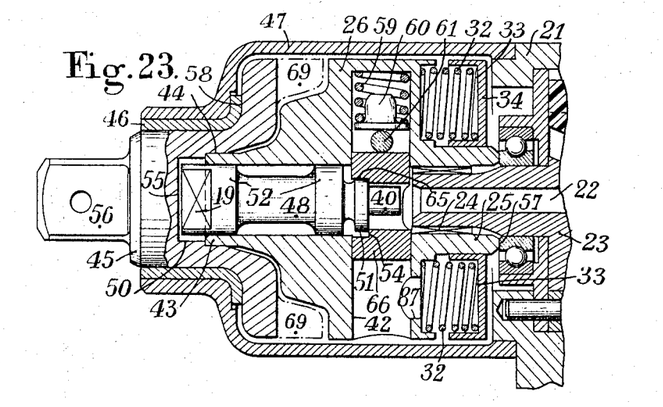
Figures 24, 25:
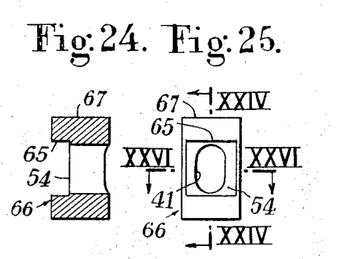
FIGURES 24, 25 and 26 illustrate respectively in section taken upon the line XXIV—XXIV, in front view and in another section taken upon the line XXVI—XXVI, the shape of the cam-responsive push member controlling the radial movement of the lock member for releasing the pair of hammers when the hammer carrier is actuated at the rate of one impact per revolution.
Figure 26:
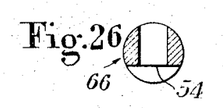
Figure 27:
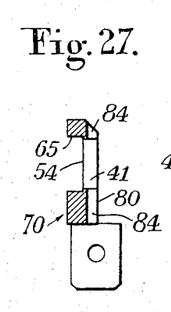
FIGURE 27 is a section taken upon the line XXVII—XXVII of FIGURE 28 showing the ratchet carrier of which the radial movement in either direction is positively controlled by the cam at each revolution of the hammer carrier.
Figure 28:
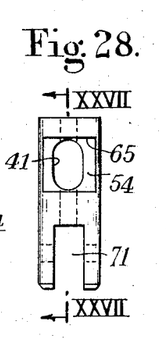
Figure 29:
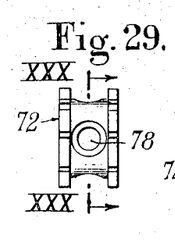
FIGURE 29 shows in side view the ratchet rotatably mounted in the strap portion of the ratchet carrier, FIGURE 30 being a cross-sectional view of this ratchet.
Figure 30:
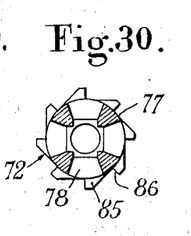
Figures 31, 32:
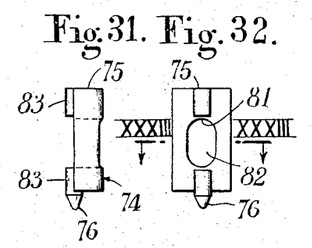
FIGURES 31, 32 and 33 are respectively a side view, a front view and a section XXXIII—XXXIII of said push member which, being responsive to the angular position of the ratchet, controls the radial movement of the lock bolt in the hammer-releasing direction only once every other revolution of the hammer carrier.

The impact mechanism comprises essentially a pair of hammers 27, 28 of same shape and weight, housed in a pair of diametrally opposite longitudinal grooves 29 and 30 formed in the hammer carrier 26. These hammers 27, 28 are fulcrumed on pivot pins 31 and constantly urged towards their axis of rotation which is the axis of the tool by a pair of coil springs 32 (see FIGURES 5 and 23) housed in cylindrical recesses 33 formed in the yoke 34 (see FIGURES 17 and 18). This yoke is adapted to transmit through its central face 35 (see FIGURES 16 and 17) the force of both springs 32 to heels 36 (see FIGURES 13 and 14) carried by the two hammers 27 and 28. The efforts thus applied to the end of these heels 36 urge the hammers for rotation about their pivot pins 31 until their bearing face 37 (see FIGURE 14) engages the bottoms 38 of the longitudinal grooves 29 and 30. FIGURE 1 shows the hammers in their fully retracted position. FIGURE 2 shows the same hammers in their outermost angular position when the curved portions 39 of these hammers (see FIGURES 2, 13 and 14) bear against the outer surface of the cylindrical rear portion 25 of hammer carrier 26. The pivot pins 31 on which these hammers are fulcrumed are held against axial motion by means not shown but familiar to anybody conversant with the art. The yoke 34 slidably centered on the aforesaid rear cylindrical portion 25 of the hammer carrier 26 in bore 40 (see FIGURES 16, 17 and 18) is guided during its axial movements by the sides 41 sliding freely in grooves 42 formed in the rear portion of said hammer carrier and extending at right angles to the longitudinal grooves 29 and 30 (see FIGURE 6).

Figure 7:
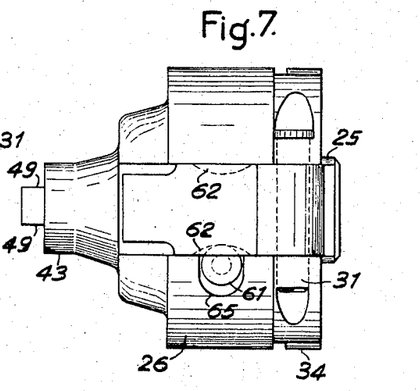

The front portion 43 of said hammer carrier 26 revolves freely in a bore 44 of tool holder 45 (see FIGURES 7, 10 and 11) rotatably mounted in turn in a sleeve 46 force-fitted in the housing 47 of the impact mechanism which constitutes the front extension of the aforesaid motor casing 21.

The camshaft 48 is rotatably rigid with the tool holder 45 due to the provision of flats 49 (see FIGURES 5 and 7) engaging freely the elongated cavity 50 of tool holder 45 (see FIGURES 5, 23, 10 and 11). The cam proper 51 is in overhanging relationship to the pair of cylindrical journal portions 52 revolving in the bore 53 of tool holder 26.

The end face 54 of the motor rotor and the bottom 55 of the elongated cavity 50 hold the camshaft 48 against axial movement with a certain clearance so that the axial stress applied to the front end of the drive square 56 of the tool holder 45 be supported by the inner race of ball-bearing 57 instead of the rotor end 54.

Figure 3:
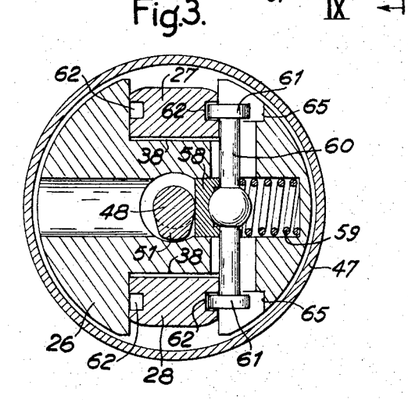
FIGURES 3 and 4 are cross-sections taken upon the lines III—III and IV—IV of FIGURES 1 and 2, showing respectively in FIGURE 3 the hammers locked in their fully retracted position, and in FIGURE 4 the hammers released in their outermost angular position.
Figure 21:
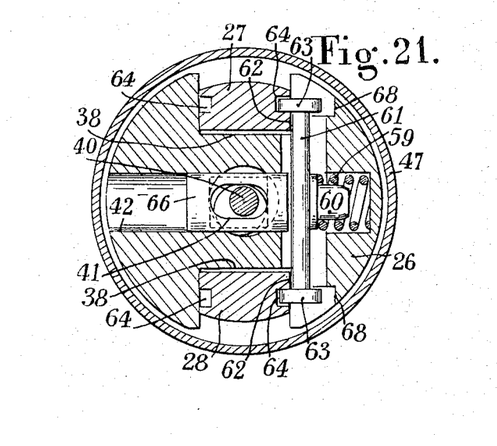

In FIGURES 3 and 21 it appears clearly that the hammers 27 and 28 are locked in their fully retracted position when the push member 58 or 67, urged by the lock spring 59, engages the low or small radius of cam 51, and the lock member 60 or 61 centered by its central portion and urged by the spring 59 in push member 58, engages its two shouldered or flanged end portions 61 or 63 into the notches 62 or 64 of each hammer 27 and 28 (see FIGURES 14 and 15); for symmetry's sake, the notches 62 are formed in each side face of these hammers.

Figure 4:
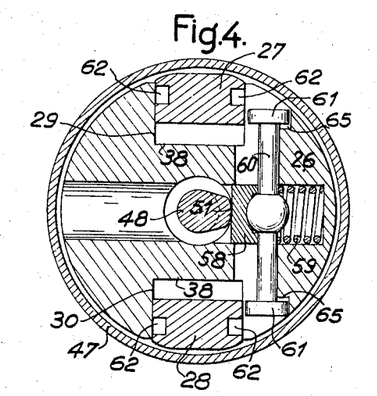
Figure 22:
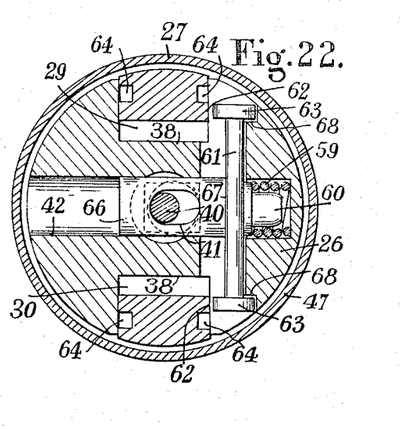

In FIGURES 4 or 22, the hammers 27 and 28 are shown as pivoting freely in their corresponding longitudinal grooves 29 and 30, and are illustrated in their maximum outermost relative angular position. Push member 58 or 66 engages the highest or major radius of cam 51, and the two flanged or shouldered end portions 61 or 63 of lock bolt 60, 61 are released from notches 62 or 64 of each hammer 27 and 28.

From FIGURES 3 and 4, or 21 and 22, and from the foregoing, it appears clearly that the hammers are locked only once per revolution of the unit comprising the motor 23 and hammer carrier 26.

Figure 9:
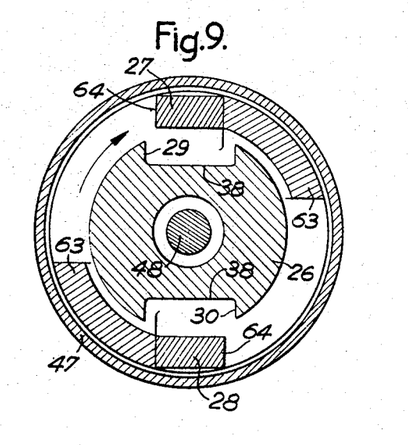
Figure 20:
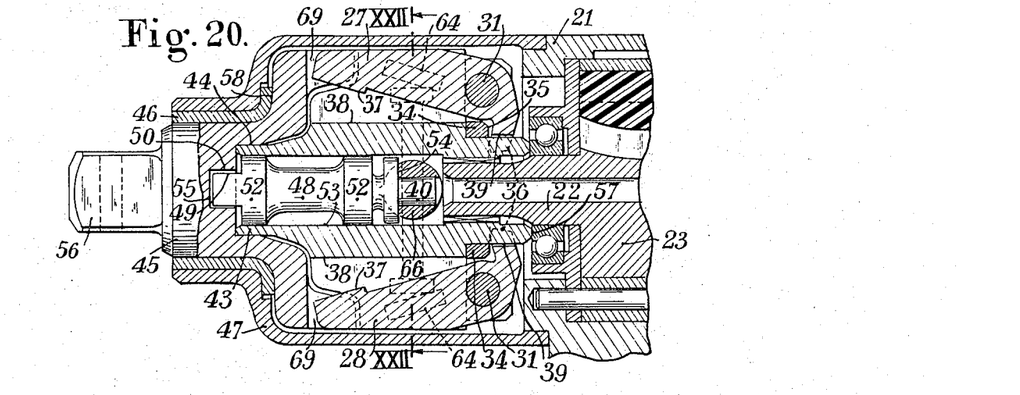

If in the position shown in FIGURES 2, 20 and 9, and by using a suitable tool, (such as a socket wrench), mounted on the square drive 56 of tool holder 45, a resistant torque locks the anvils 63 in the position shown in the drawings, the hammer carrier 26 rotatably coupled with the motor rotor 23 revolves in the direction shown by the arrow, the hammers 27 and 28 being free in their corresponding grooves 29 and 30 will attain their outermost angular position under the influence of the centrifugal force when they are in their position of striking engagement with the impact sides of anvils 63. Referring to FIGURES 2, 20 and 9 it appears clearly that at the precise moment of the impact all the kinetic energy of the motor-rotor unit 23, hammer carrier 26 and hammers 27, 28 will apply to the anvils 63 through the striking faces 64 of these hammers (see FIGURES 14 and 15) a shock of a force proportional to the angular velocity of the assembly.

In order to obtain a regular operation of the impact mechanism with extreme air pressure values ranging from 40 p.s.i. to 100 p.s.i., the force of the pair of return springs 32 (see FIGURE 5) which is applied through the medium of the central face 35 of yoke (see FIGURE 16) against the heels 36 of each hammer (see FIGURE 14) should not be inferior to that exerted by the lowest centrifugal force when the air pressure applied to the motor is about 40 p.s.i., so that the hammers may attain their outermost angular position at the time of the impact (see FIGURE 9). Immediately after this impact the angular velocity and the centrifugal force cancel each other but the motor torque keeps urging the striking faces 64 of the hammers against the anvils 63 with a force substantially proportional to the motor air feed pressure.

The effort applied to the end of the heels 36 of each hammer should be sufficient to overcome the frictional contact between the striking sides 64 and the anvils 63, on the one hand, and between the hammers and the walls of the longitudinal grooves 29 and 30 in which they are fulcrumed, on the other hand, when the motor torque has its maximum value (for example when the motor air feed pressure is about 100 p.s.i.).

Figure 8:
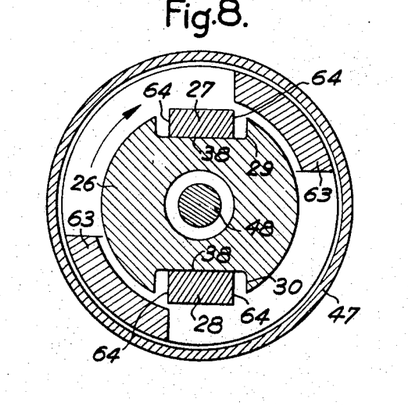
FIGURES 8 and 9 are cross-sections taken upon the lines VIII—VIII and IX—IX of FIGURES 1 and 2, showing respectively the hammers in their fully retracted position and in their outermost angular position.

The hammers 27 and 28 pivot about their pins 31 and thus release the anvils 63 and when they are in their fully retracted position the motor torque accelerates again the rotation of the assembly in the direction of the arrows and, as shown in FIGURES 3 and 21, after a half-revolution with respect to the position shown in FIGURE 8, the push member 58 or 41, as a consequence of the rotation of the hammer carrier and due to the force of locking springs 69, engages the small radius of the cam contour 51, whereby the lock member 60 or 61 centered and bearing through the central portion into the push member due to the spring force engages its shouldered or flanged end portions 61 or 63 into the notches 62 or 64 of each hammer.

The hammers thus retained in their grooves are in the position shown in FIGURES 3 or 21, without having their striking faces 64 in contact with the anvils 63 or 69. After an angular movement of about 90° (not shown in the drawings) in relation to the position of FIGURE 3 or 21, the cam 51 is positioned as shown in FIGURE 4 or 22, push member 58 or 66 engaging again the maximum cam radius and holding in position the two end portions 61 or 63 of the lock member into the recesses 65 or 68 of the hammer carrier (see FIGURES 3, 4 or 21, 22 and 7). The hammers 27 and 28 being free are projected outwards by the increasing centrifugal force and their maximum outward angular position is attained when the curved portion 39 of heels 36 (see FIGURE 13) engages the cylindrical rear portion 25 of hammer carrier 26. The increase in the angular velocity of the rotary assembly continues until the side faces 64 engage the anvils 63 or 69 as shown in FIGURE 9, thus producing at the time of the impact a shock of a force proportional to the angular velocity of the assembly. This velocity is subordinate to the motor power output which is adjustable by means of a knurled knob (not shown in the drawing) acting upon an output limiting device.

From the foregoing it is clear that the frequency of hammer release cannot exceed once per revolution of the impact mechanism (it being assumed that the resistant torque of the bolt or nut to be tightened is high enough to keep the anvils to a nearly complete standstill), which corresponds to the maximum impact frequency.

In the alternate form of embodiment illustrated in FIGURES 27 to 43 the push member 66 is replaced with a series of elements adapted to convert the mechanism providing one impact per revolution into a mechanism providing one impact every other revolution of the rotary assembly comprising the hammers, the hammer carrier and the motor rotor. The angular velocity of this rotary assembly being about one and a half time higher at the impact moment in a mechanism providing one impact every other revolution, the impact rate is slower, but the shock effect when the hammer striking faces strike the anvil is about twice as high as with the one-impact-per-revolution mechanism, whereby very high tightening or release torques may be obtained without increasing neither the reaction nor the over-all dimensions of an impact wrench designed according to this alternate form of embodiment.

As shown in FIGURES 27 to 42, the push member 66 is replaced by a ratchet holder 70 (see FIGURES 27 and 28) comprising a strap 71 in which a ratchet 72 (see FIGURES 29 and 30) is mounted for free rotation on a pin 73. The radial movement of the ratchet holder in the bore 42 of the hammer carrier is controlled by a cam 51 under the same conditions as the movement of the preceding push member 66, a bearing face 65 being formed to this end to the ratchet holder 70; the necessary guiding action is obtained by forming in this holder an elongated aperture 41 sliding freely on the crankpin 40 of camshaft 48. The push member 74 (see FIGURES 31, 32 and 33) has the same function as the aforesaid push member 66 for controlling with its face 75 the radial outward movement of the central rod 61 and of the pair of shouldered end portions 63 for releasing the hammers. This movement takes place only when the rounded operative end 76 engages the outer cylindrical portion 77 between two tapered radial holes 78 formed in the ratchet 72 (see FIGURES 29, 30 and 40).

Figure 33:
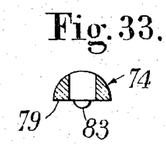
Figure 34:
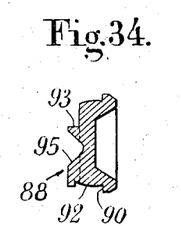
FIGURES 34 and 35 show respectively in section taken upon the line XXXV—XXXV of FIGURE 35 and in front view the pawl urging the ratchet to its next angular position at about 45° upon each revolution of the hammer carrier, and FIGURES 36 to 43 inclusive show in fragmentary sections and on a larger scale, in view similar to that of FIGURE 23, the various steps of the operation of the complementary mechanism substituted for the single push member of FIGURES 24, 25 and 26 for limiting the hammer release to only once every other revolution of the hammer carrier, and more particularly.
Figure 35:
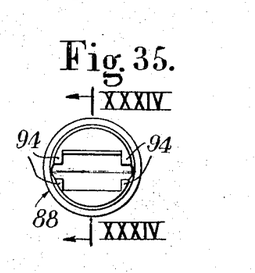

FIGURE 33 shows in section (taken upon the line XXXIII—XXXIII of FIGURE 32) the semi-cylindrical cross-sectional configuration of push member 74 of this alternate form of embodiment, the face 79 being adapted to slide with a certain play along the face 80 (see FIGURE 27) of ratchet carrier 70. The bottom 81 of buttonhole 82 formed in push member 74 (see FIGURE 32) engages the crankpin 40 of camshaft 48 to limit the permissible inward radial movement of this push member. The cylindrical extension of the operative end 76 of this push member comprises a semi-cylindrical inner extension 83 leading to the opposite face 75 (see FIGURES 31, 32 and 33) which is adapted to slide freely in a groove 84 of corresponding contour formed in the face 80 of ratchet holder 70 (see FIGURES 27 and 28). The ratchet 72 (see FIGURES 29 and 30) consists of a cylindrical body 77 having four equally spaced radial holes 78 formed therein, with a tapered axial bore. This cylindrical portion comprises at either end a flange in which eight spaced teeth 85 are formed, the radial sides 86 of these teeth lying in planes intersecting the axes of said tapered holes 78 (see FIGURE 30). In the hole 87 opening into the central bore 42 of hammer carrier 26 (see FIGURE 23) a pawl 88 (see FIGURES 34 and 35) is mounted. The taper coil spring 89 constantly urges the shouldered portion 90 of this pawl against an annular surface 91 of the rear portion 25 of the hammer carrier and the spherical outer surface 92 of this pawl 88, which is centered in the hole 87 permits the pawl movement necessary for releasing same during the engagement of the teeth 85 of ratchet 72 with the projection 93 of pawl 88 (see FIGURES 34, 39 and 43). The side faces 94 (see FIGURE 35) engaging freely the sliding strap 71 of ratchet carrier 70 (see FIGURE 28) keeping the aforesaid projection 93 in a plane parallel to the radial portion 86 of said ratchet teeth. The inclined side face 95 engages the tip of the radial portion 86 of a ratchet tooth 85 when the preceding tooth leaves the pawl projection 93 (see FIGURES 37 and 41).

Figures 36, 37:
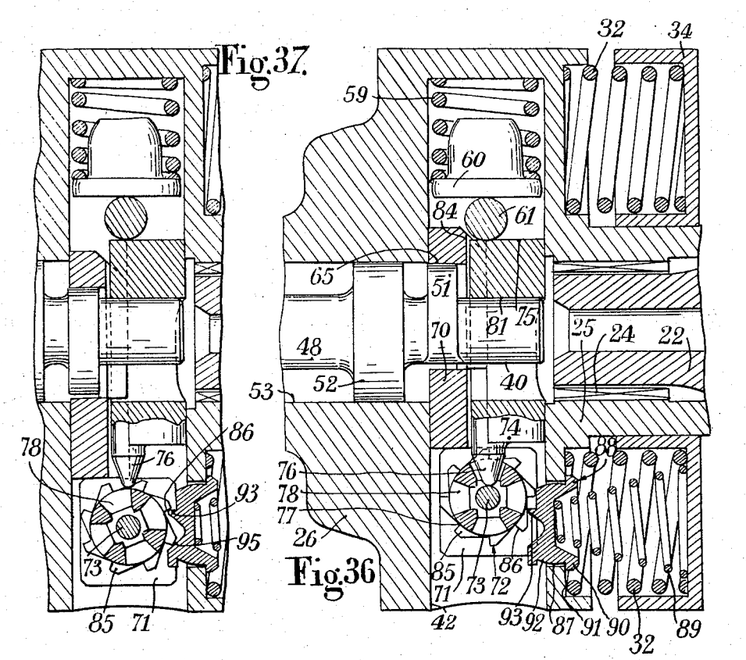
FIGURE 36 shows the ratchet carrier in its extreme position nearest to the center of the tool, with the operative end of the push member engaging one of the ratchet holes, and the hammers completely retracted and locked.
FIGURE 37 shows, after a radial outward movement of said ratchet carrier which corresponds to about the three-quarters of its permissible stroke, the angular position of the ratchet after its driving engagement with the pawl.

FIGURE 36 shows how the operative end 76 of push member 74 engaged in a tapered hole 78 of ratchet 72 was not influenced by the maximum radial movement towards the center of the ratchet carrier 70, as the portion 65 of this carrier (see FIGURES 27 and 28) engages the highest radius of the cam contour 51 while the bottom 81 of buttonhole 82 of push member 74 (see FIGURE 32) engages the crankpin 40 of camshaft 48, with the rod 61 of the lock bolt contacting the face 75 of push member 74 as well as the faces 62 of the hammers (see FIGURE 21), thus completely locking these hammers.

In FIGURE 37, the position of the ratchet carrier corresponds to a rotation of about slightly more than one-quarter of a revolution of the hammer carrier with respect to the position shown in FIGURE 36, that is, about the three-fourths of the radial outward movement of the ratchet carrier 70. The relative engagement of projection 93 of pawl 88 with the radial face 86 of one of the ratchet teeth 85 causes the ratchet 72 to pivot about its fulcrum pin 73 and the tapered point 76 of the push member is thus released from the conical hole 78. The position of the push member remains unchanged as well as the locking condition of the hammers.

Figure 38:
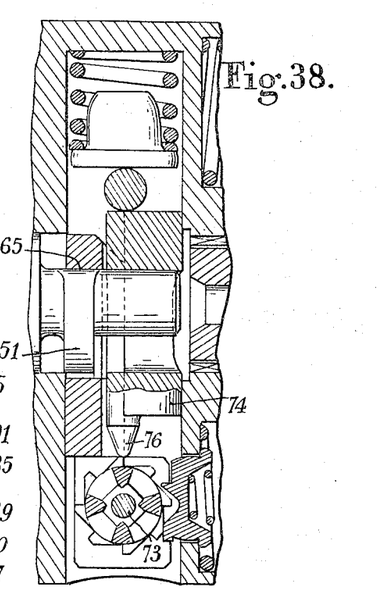
FIGURE 38 illustrates the ratchet carrier in its outermost radial position, the ratchet having rotated through an angle of about 45° from the position shown in FIGURE 36.

FIGURE 38 corresponds to a half-revolution rotation of the hammer carrier from the initial position shown in FIGURE 36, the portion 65 of the ratchet carrier engaging the highest radius of cam 51 to attain its outermost radial position. The rotation of the hammer carrier promotes the contact between the aforesaid portion 65 and the cam contour 51 during the radial movement (whether outwards or inwards) of the ratchet carrier under the influence of the centrifugal force. This force is also exerted on the ratchet and assists in stabilizing its fixed position on the pivot pin 73, as shown in the drawing, during the passage from the position of FIGURE 38 to that of FIGURE 39. As shown in the preceding figures, the rounded taper tip 76 of the push member being spaced from the ratchet 72, the hammers are kept in their locked condition.

Figure 39:
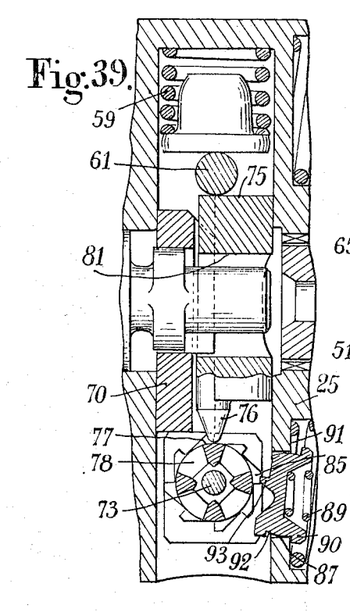
FIGURE 39 shows the radial movement of the ratchet carrier at about mid-stroke towards the center, with the operative end of the push member engaging the cylindrical surface of the ratchet and about to release the lock member from its locking position; as a consequence of the resilient force of the locking spring, the operative end of the push member locks the ratchet and the ratchet teeth keep the pawl in its released position until the ratchet has attained the next angular position in which it is detent-positioned by the pawl.

FIGURE 39 shows the ratchet carrier 70 at about mid-stroke during its radial inward movement, this position corresponding to about the three-fourths of a revolution with respect to FIGURE 36. The rounded taper tip 76 of the operative end of push member 74 engages the cylindrical portion 77 disposed between two tapered holes 78. The face 75 of push member 74 urges the rod 61 radially outwards, the end portions 63 remaining half-engaged in the notches 64 so that the hammers are still locked.

The force of the lock spring 59 which is exerted by the rounded portion 76 against the cylindrical portion 77 locks the ratchet on its pivot pin 73, the engagement of the tip of a ratchet tooth 85 with the pawl projection 93 causes the pawl to pivot on its part-spherical portion 92 in the hole 87, the shouldered portion 90, due to the thrust exerted by the taper coil spring 89, remaining in engagement with a point opposite to said projection 93 on the annular face 91.

Figure 40:
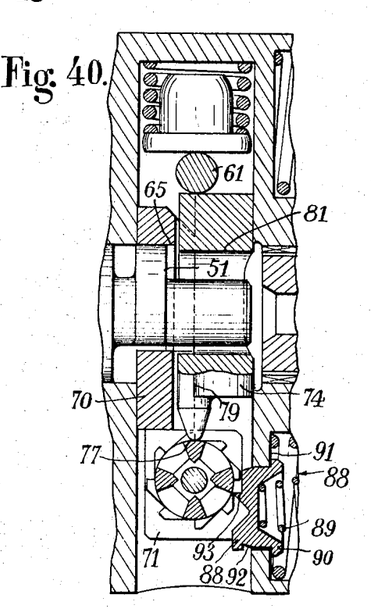
FIGURE 40 shows the ratchet carrier in its maximum inward position and the push member and lock member in their outermost radial position after a complete revolution of the hammer carrier which took place between the positions shown in FIGURES 36 to 40.

FIGURE 40 shows, after a complete revolution of the hammer carrier from the position shown in FIGURE 36, the innermost position of the ratchet carrier 70 during its inward travel. The push member 74 and lock rod 61 are in their outermost radial positions, and both hammers 27 and 28 are released and attain their outermost angular position. The portion 65 of said ratchet carrier engages the highest radius of cam 51. The shouldered portion 90 of pawl 88 engages with its entire surface the annular face 91.

Figure 41:
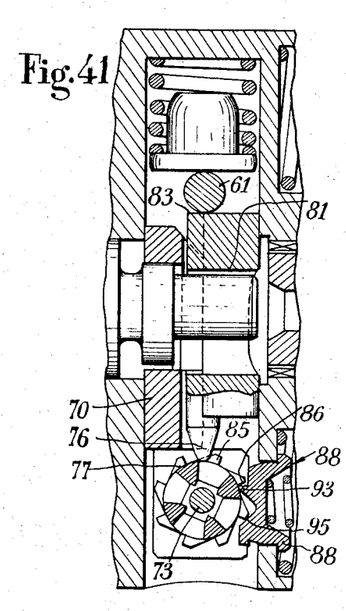
FIGURE 41 is similar to FIGURE 37 as to the position of the ratchet carrier and shows the angular movement performed by this ratchet carrier as a consequence of its engagement by the pawl, the operative end of the push member engaging one of the tapered holes of the ratchet as a consequence of the resilient pressure exerted by the lock spring, the hammers being locked.

The impact of hammers 27 and 28 on the anvils 69 takes place at a position (not shown in the drawings) intermediate the positions shown in FIGURES 40 and 41.

FIGURE 41 corresponds to a rotation of about one quarter of a revolution of the hammer carrier from the position shown in FIGURE 36, the position of the ratchet carrier 70 being substantially the same as that shown in FIGURE 19. The projection 93 of pawl 88, by engaging the radial face 86 of a ratchet tooth 85 causes the ratchet to pivot about its pin 73, the tip 76 of push member 75 being about to leave the cylindrical portion 77 of the ratchet. The hammers are locked and the pawl is in the same position as in the preceding figure.

Figure 42:
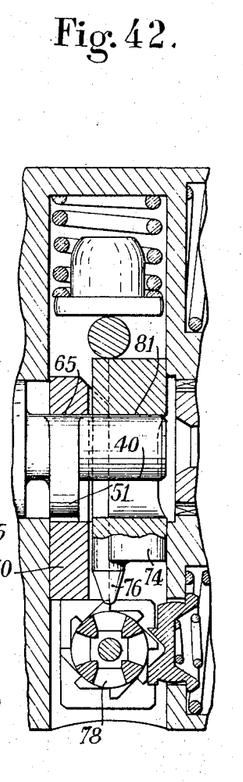
FIGURE 42 is similar to FIGURE 38 as far as the outermost radial position of the ratchet carrier is concerned, the angular position of this ratchet being otherwise similar to that shown in FIGURE 36.

FIGURE 42 shows that after a one-and-half revolution of the hammer carrier from the position of FIGURE 36, the positions of ratchet carrier 70 and push member 74 are respectively the same as those shown in FIGURE 38. The portion 65 of ratchet carrier 70 bears on the smallest radius of cam 51 and the bottom 81 of the push member buttonhole engages the crankpin 40 of camshaft 48. The ratchet has pivoted through one-eighth of a revolution in relation to FIGURE 38, a tapered hole 78 registering with the point 76 of push member 75.

Figure 18:
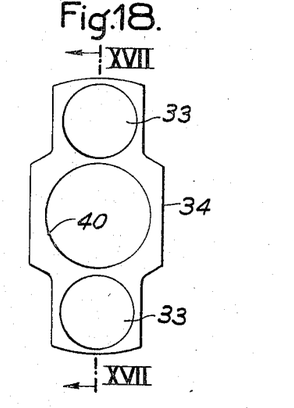
Figure 43:
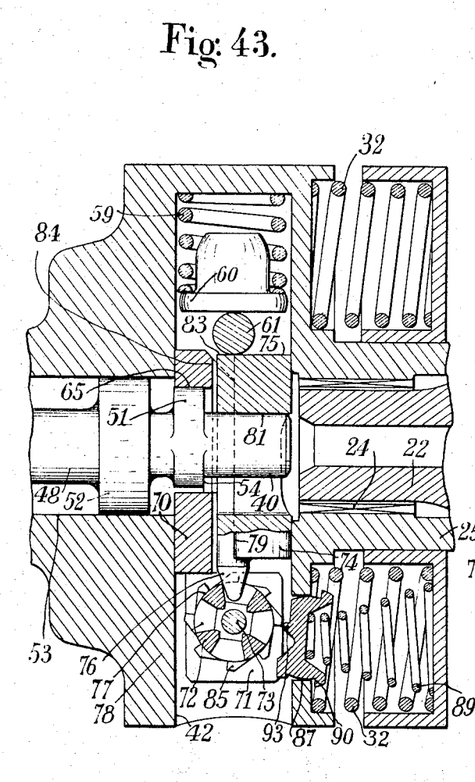
FIGURE 43 shows the ratchet carrier in the same radial position as in FIGURE 39 during its inward stroke, the engagement of the operative end of the push member into one of the four tapered holes of the ratchet illustrating clearly the angular ratchet position obtaining as a consequence of the engagement of the ratchet teeth with the pawl urged in turn by its tapered coil spring.

FIGURE 43 shows clearly how, after a one- and three-quarters of rotation of the hammer carrier from the position shown in FIGURE 18, the point 76 of push member 75 engages a tapered hole 78 of the ratchet, the ratchet carrier being substantially in the same radial position as that of FIGURE 39. The tip of one tooth 85 of the ratchet engages the pawl projection 93 and urges the latter so as to tilt the pawl with its part-spherical portion 92 engaging the hole 87. The effort applied to the ratchet wheel to release the pawl causes the latter to pivot slightly until the point 76 engages the edge of a tapered hole 78 in which it is engaged, the reaction resulting from this movement having no influence whatsoever on the push member 74, the hammers being still locked. After two complete revolutions of the hammer carrier, the mechanism is shown in its innermost radial position, with the tip of the push member completely engaged in one of the tapered holes, the position of this push member and the locking of said hammers remaining unchanged.

From the foregoing it is clear that the frequency of release of the hammers cannot exceed once every other revolution of the impact mechanism (the resistant torque of the bolt or nut to be tightened being assumed to be relatively high to keep the anvils at a nearly complete standstill), which corresponds to the maximum impact frequency.

It is clear that the form of embodiment shown and described herein by way of example should not be construed as limiting the invention since many modifications and variations based on the same principles may be resorted to without departing from the spirit and scope of the invention as set forth in the appended claims.

What I claim is:

1. A portable power tool for tightening or loosening screws or nuts by rotation, which comprises a tool holder mounted for free rotation and formed with a drive front end adapted to engage a socket of the screw or nut to be rotated for screwing or releasing same, and two diametrally opposite anvils, a hammer carrier mounted behind the end of said tool holder, said hammer carrier having a drive-shaft forming rear end and two diametrally opposite longitudinal grooves lying in an axial plane, a pair of pins mounted across said grooves, a pair of hammers fulcrumed in said grooves about said pins and formed externally with a pair of striking faces adapted simultaneously to strike said pair of anvils during one revolution of said hammer carrier, a power shaft rigidly connected to said hammer-carrier drive shaft and adapted rotatably to drive said hammer carrier, each said hammer having rearwardly formed heels thereon, a yoke operatively arranged to engage said heels of said hammers, resilient return means consisting of a pair of coil compression springs mounted in longitudinal recesses of said hammer carrier and operatively arranged to exert a biasing force against said yoke effective to urge said hammers to an inner released position in which their striking faces are retracted in relation to said tool-holder anvils, a locking device mounted in said hammer carrier for holding said hammers in their released position against the centrifugal force, and means for releasing said locking devices which operate in synchronism with said tool holder.

2. An impact wrench as set forth in claim 1, wherein said rear heels of said hammers are so disposed that when said hammers are tilted in the expanding direction as a consequence of the centrifugal force applied thereto, they abut against a bearing surface provided on said hammer carrier, thus limiting to a maximum amplitude the permissible hammer expansion.

3. An impact wrench as set forth in claim 1, wherein said locking device comprises a rod mounted in said hammer carrier parallel to the flats of the grooves in which said hammers are fulcrumed, and a spring urging said rod towards said hammers, the hammers having longitudinal notches formed therein, said rod having shouldered ends engageable respectively into said notches under the influence of said last-named spring when said hammers are pivoted to their retracted position.

4. An impact wrench as set forth in claim 3, wherein said means for releasing said locking device comprises a push member acting upon said rod against the force of its spring, a shaft rotatably solid with said tool holder and extending radially through said hammer carrier, and a cam formed on said shaft and controlling said push member in synchronism with the rotation of said hammer carrier in relation to said tool holder.

5. An impact wrench as set forth in claim 4, wherein said cam is adapted to actuate said push member against said rod spring by direct contact with said push member, whereby said pair of hammers are caused to produce one impact per revolution of said hammer carrier.

6. An impact wrench as set forth in claim 4, wherein said cam is adapted to actuate said push member against the resistance of its spring due to the interposition of an intermediate member co-acting with said hammer carrier in order to vary the useful length thereof on synchronism with the rotation of said hammer carrier, said useful length attaining the value necessary for releasing said hammer locking device only once during several revolutions of said hammer carrier.

7. An impact wrench as set forth in claim 6, wherein said intermediate member comprises a support adapted to be reciprocated by said cam and a ratchet wheel rotatably mounted in said support, a spring loaded pawl mounted in said hammer carrier and adapted to control the rotation of said ratchet wheel, said push member being provided with a tapered rounded tip resiliently engaging the outer periphery of said ratchet wheel as a consequence of the spring action exerted on said rod, said outer periphery of said ratchet wheel having a plurality of spaced tapered holes formed therein, the release being controlled only when simultaneously said support is in its end position towards said rod spring and said rounded tapered tip of said push member engages the outer periphery of said ratchet wheel at a point intermediate two tapered holes thereof.

References Cited
UNITED STATES PATENTS

| | | | |
|---|---|---|---|
| 2,219,883 | 10/1940 | Amtsberg | 173—93.6 |
| 2,313,603 | 3/1943 | Van Sitter | 173—93.5 |
| 2,520,920 | 9/1950 | Fosnot | 173—93.5 |
| 2,684,738 | 7/1954 | Kaplan | 173—93.5 |
| 3,144,109 | 8/1964 | Alajouanine | 173—93.5 |

FOREIGN PATENTS 1,291,020  12/1962  France.

FRED C. MATTERN, Jr., *Primary Examiner.*

L. P. KESSLER, *Assistant Examiner.*